United States Patent
Minoo et al.

(10) Patent No.: US 9,986,251 B2
(45) Date of Patent: *May 29, 2018

(54) REFERENCE LAYER AND SCALED REFERENCE LAYER OFFSETS FOR SCALABLE VIDEO CODING

(71) Applicant: ARRIS Enterprises LLC, Suwanee, GA (US)

(72) Inventors: Koohyar Minoo, San Diego, CA (US); David M. Baylon, San Diego, CA (US); Ajay K. Luthra, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 209 days.

This patent is subject to a terminal disclaimer.

(21) Appl. No.: 14/702,007

(22) Filed: May 1, 2015

(65) Prior Publication Data

US 2015/0319447 A1    Nov. 5, 2015

Related U.S. Application Data

(60) Provisional application No. 61/987,466, filed on May 1, 2014.

(51) Int. Cl.
*H04N 19/33* (2014.01)
*H04N 19/59* (2014.01)
(Continued)

(52) U.S. Cl.
CPC .......... *H04N 19/33* (2014.11); *H04N 19/182* (2014.11); *H04N 19/187* (2014.11); *H04N 19/59* (2014.11);
(Continued)

(58) Field of Classification Search
None
See application file for complete search history.

(56) References Cited

U.S. PATENT DOCUMENTS 9,491,459 B2 * 11/2016 Seregin ................. H04N 19/56
2004/0008790 A1    1/2004 Rodriguez
(Continued)

FOREIGN PATENT DOCUMENTS

WO    2013174254 A1    11/2013
WO    2013184954 A2    12/2013
(Continued)

OTHER PUBLICATIONS

PCT Invitation to Pay Additional Fees (Form ISA/206), dated Jul. 21, 2015.
(Continued)

*Primary Examiner* — Reza Aghevli
(74) *Attorney, Agent, or Firm* — Lori Anne D. Swanson

(57) ABSTRACT

A process for determining the selection of filters and input samples is provided for scalable video coding. The process provides for re-sampling using video data obtained from an encoder or decoder process of a base layer (BL) in a multi-layer system to improve quality in Scalable High Efficiency Video Coding (SHVC). It is proposed that a single scaled reference layer offset be derived from two scaled reference layer offset parameters, and vice-versa. It is also proposed that a single scaled reference layer offset or a single reference layer offset be derived from a combination of a scaled reference layer offset parameter and a reference layer offset parameter.

12 Claims, 8 Drawing Sheets

(51) Int. Cl.
*H04N 19/70* (2014.01)
*H04N 19/80* (2014.01)
*H04N 19/187* (2014.01)
*H04N 19/593* (2014.01)
*H04N 19/182* (2014.01)

(52) U.S. Cl.
CPC ........... *H04N 19/593* (2014.11); *H04N 19/70* (2014.11); *H04N 19/80* (2014.11)

(56) References Cited

U.S. PATENT DOCUMENTS

| | | |
|---|---|---|
| 2006/0268991 A1 | 11/2006 | Segall et al. |
| 2007/0189390 A1 | 8/2007 | Pappas et al. |
| 2009/0060040 A1 | 3/2009 | Jeon et al. |
| 2009/0274214 A1 | 11/2009 | Yoon et al. |
| 2010/0226437 A1 | 9/2010 | Robertson et al. |
| 2013/0287093 A1* | 10/2013 | Hannuksela ..... H04N 19/00769 375/240.02 |
| 2013/0329782 A1 | 12/2013 | Seregin et al. |
| 2013/0342644 A1* | 12/2013 | Rusanovskyy ...... H04N 19/597 348/43 |
| 2014/0064386 A1 | 3/2014 | Chen et al. |
| 2014/0098883 A1* | 4/2014 | Hannuksela ......... H04N 19/597 375/240.16 |
| 2014/0168362 A1* | 6/2014 | Hannuksela ....... H04N 13/0048 348/43 |
| 2014/0177718 A1 | 6/2014 | Rusert |
| 2014/0192886 A1* | 7/2014 | Fran Ois .............. H04N 19/503 375/240.16 |
| 2014/0218473 A1* | 8/2014 | Hannuksela ......... H04N 19/597 348/43 |
| 2014/0254679 A1 | 9/2014 | Ramasubramonian et al. |
| 2014/0269897 A1 | 9/2014 | Baylon et al. |
| 2014/0301463 A1* | 10/2014 | Rusanovskyy ........ H04N 19/52 375/240.14 |
| 2014/0301488 A1 | 10/2014 | Baylon et al. |
| 2014/0328398 A1 | 11/2014 | Chen et al. |
| 2015/0110200 A1 | 4/2015 | Nakagami |
| 2015/0189298 A1* | 7/2015 | Ye ....................... H04N 19/196 375/240.02 |
| 2015/0195554 A1 | 7/2015 | Misra et al. |
| 2015/0237376 A1* | 8/2015 | Alshina .................. H04N 19/65 375/240.02 |
| 2015/0245063 A1* | 8/2015 | Rusanovskyy ...... H04N 19/597 375/240.12 |
| 2015/0304665 A1* | 10/2015 | Hannuksela ........... H04N 19/70 375/240.02 |
| 2015/0319477 A1 | 11/2015 | Haberman |
| 2015/0341661 A1 | 11/2015 | Alshina et al. |
| 2016/0088303 A1 | 3/2016 | Lee |
| 2016/0353115 A1 | 12/2016 | Samuelsson et al. |

FOREIGN PATENT DOCUMENTS

| | | |
|---|---|---|
| WO | 2014025741 A2 | 2/2014 |
| WO | 2014039547 A1 | 3/2014 |
| WO | 2014/189300 A1 | 11/2014 |

OTHER PUBLICATIONS

K. Minoo, et al., "Increased resolution for scaled reference layer offset", 17th JCT-VC Meeting (Joint Collaborative Team on Video Coding of ISO/IEC JTC1/SC29/WG11 and ITU-T SG.16), Mar. 27, 2014.
K. Minoo, et al., "Report of side activity on reference position derivation", 17th JCT-VC Meeting (Joint Collaborative Team on Video Coding of ISO/IEC JTC1/SC29/WG11 and ITU-T SG.16), Apr. 3, 2014.
E. Alshina, "AHG13: Re-sampling process with generic phase", 18th JCT-VC Meeting (Joint Collaborative Team on Video Coding of ISO/IEC JTC1/SC29/WG11 and ITU-T SG.16), Jul. 2, 2014.
J. Boyce, "BoG report on SHVC upsampling process and phase offset", 17th JCT-VC Meeting (Joint Collaborative Team on Video Coding of ISO/IEC JTC1/SC29/WG11 and ITU-T SG.16), Apr. 3, 2014.
PCT Search Report & Written Opinion, RE: Application No. PCT/US2015/028828, dated Sep. 29, 2015.
K. Minoo, et al., "Scalable video coding using increased resolution for scaled reference layer offset," ARRIS disclosure U.S. Appl. No. 61/955,123, filed Mar. 18, 2014.
J. Chen, et al., "High efficiency video coding (HEVC) scalable extension Draft 5," JCTVC-P1008_v4, Jan. 2014.
K. Minoo, et al., "Specification of scaled reference layer in scalable video coding," ARRIS disclosure U.S. Appl. No. 61/972,162, filed Mar. 28, 2014.
K. Minoo, et al., "AHG13: SHVC Upsampling with phase offset adjustment", 104th MPEG Meeting (Motion Picture Expert Group or ISO/IEC JTC1/SC29/WG11, Apr. 20, 2013.
J. Chen, et al., "MV-HEVC/SHVC HLS: On signaling of scaled reference offset", 14th JCT-VC Meeting (Joint collaborative Team on Video Coding of ISO/IEC JTC1/SC29/WG11 and ITU-T SG.16) Jul. 16, 2013.
G.J. Sullivan, et al., "Standardized Extensions of High Efficiency Video Coding (HEVC)", IEEE Journal of Selected Topics in Signal Processing., vol. 7, No. 6, Dec. 1, 2013, pp. 1001-1016.
K. Andersson, et al., "Fix for the computation of scaling factors used in inter-layer prediction", 17th JCT-VC Meeting (Joint Collaborative Team on Video Coding of ISO/IEC JTC1/SC29/WG11 and ITU-T SG.16), Mar. 17, 2014.
Y Ye, et al., "SHVC HLS: On picture level resampling phase filter selection", 17th JCT-VC Meeting (Joint Collaborative Team on Video Coding of ISO/IEC JTC1/SC29/WG11 and ITU-T SG.16), Mar. 18, 2014.
K. Minoo, et al., "Re-sampling with phase offset adjustment and signaling using phase index re-mapping," ARRIS disclosure U.S. Appl. No. 61/923,450, filed Jan. 3, 2014.
K. Minoo, et al., "SCE1: Results of Test 2.2 on phase compensation by signaling filter coefficients at PPS with sample shift", JCTVC-N0078, 14th JCT-VC Meeting, Vienna, AT, Jul. 2013, 4 pgs.
K. Minoo, et al., "Non-SCE1: On handling re-sampling phase offsets with fixed filters", JCTVC-N0272, 14th JCT-VC Meeting, Vienna, AT, Jul. 2013, 5 pgs.
K. Minoo, et all., "On handling re-sampling phase offsets with fixed filters", JCTVC-P0177-R1, 16th JCT-VC Meeting, San Jose, US, Jan. 2014, 6 pgs.
J. Chen, et al., "Description of scalable video coding technology proposal by Qualcomm (configuration 2)" 11th JCT-VC Meeting; 102. MPEG Meeting; Oct. 2, 2012, 22 pgs.
B. Bross, et al., "High Efficiency Video Coding (HEVC) text specification draft 8", 10th JCT-VC Meeting; 101. MPEG Meeting; Jul. 23, 2012, 286 pgs.
S-W Park, et al., "Intra BL pred. & phase shift", 15th JVT Meeting; 72. MPEG Meeting; Apr. 16, 2005, 16 pgs.
J Dong, et al., "Upsampling based on sampling grid information for aligned inter layer prediction", 13th JCT-VC Meeting; 104; MPEG Meeting; Apr. 8, 2013, 10 pgs.
D. Kwon, et al., "Reference-layer cropping offsets signaling in SHVC", Joint Collaborative Team on Video Coding JCT-VC) of ITU-T SG 16 WP 3 and ISO/IEC JTC 1/SC 29/WG 11, 13th Meeting, Apr. 18-26, 2013, 2 pgs.
PCT Search Report & Written Opinion, Re: Application No. PCT/US2015/021341, dated Jun. 25, 2015.
PCT Search Report & Written Opinion, Re: Application No. PCT/US2015/033628, dated Sep. 17, 2015.
PCT Search Report & Written Opinion, Re: Application No. PCT/US2014/033704, dated Jun. 30, 2014.
"High Efficiency Video Coding", Series H. Audiovisual and Multimedia Systems; Infrastructure of audiovisual services—Coding of moving video, ITU-T Telecommunication Standardization Sector of ITU, H.265, Apr. 2013, 317 pgs.

\* cited by examiner

REFERENCE LAYER AND SCALED REFERENCE LAYER OFFSETS FOR SCALABLE VIDEO CODING

CROSS REFERENCE TO RELATED APPLICATION

This Application claims priority under 35 U.S.C. § 119(e) from earlier filed U.S. Provisional Application Ser. No. 61/987,466 filed on May 1, 2014 and incorporated herein by reference in its entirety.

TECHNICAL FIELD

The embodiments disclosed herein relate to a sampling filter process for scalable video coding. More specifically, the disclosed embodiments relate to re-sampling using video data obtained from an encoder or decoder process, where the encoder or decoder process can be MPEG-4 Advanced Video Coding (AVC) or High Efficiency Video Coding (HEVC). Further, the current embodiments specifically relate to Scalable HEVC (SHVC) that includes a two layer video coding system.

BACKGROUND

Scalable video coding (SVC) refers to video coding in which a base layer (BL), sometimes referred to as a reference layer, and one or more scalable enhancement layers (EL) are used. For SVC, the base layer can carry video data with a base level of quality. The one or more enhancement layers can carry additional video data to support higher spatial, temporal, and/or signal-to-noise SNR levels. Enhancement layers may be defined relative to a previously coded layer.

The base layer and enhancement layers can have different resolutions. Upsampling filtering, sometimes referred to as resampling filtering, may be applied to the base layer in order to match a spatial aspect ratio or resolution of an enhancement layer. This process may be called spatial scalability. An upsampling filter set can be applied to the base layer, and one filter can be chosen from the set based on a phase (sometimes referred to as a fractional pixel shift). The phase may be calculated based on the ratio between base layer and enhancement layer picture resolutions.

SUMMARY

Embodiments of the present invention provide methods, devices and systems for the upsampling process from BL resolution to EL resolution to implement the upsampling of FIG. 2. The upsampling process of embodiments of the present invention includes three separate modules, a first module to select input samples from the BL video signal, a second module to select a filter for filtering the samples, and a third module using phase filtering to filter the input samples to recreate video that approximates the EL resolution video. The filters of the third module can be selected from a set of fixed filters each with different phase. In these modules, the selection of the input samples and filters for generating the output samples are determined based upon a mapping between the EL sample positions and the corresponding BL sample positions. The embodiments included herein are related to the mapping or computation between the EL and the BL sample positions.

BRIEF DESCRIPTION OF THE DRAWINGS

Further details of the present invention are explained with the help of the attached drawings in which.

DETAILED DESCRIPTION

Figure 1:
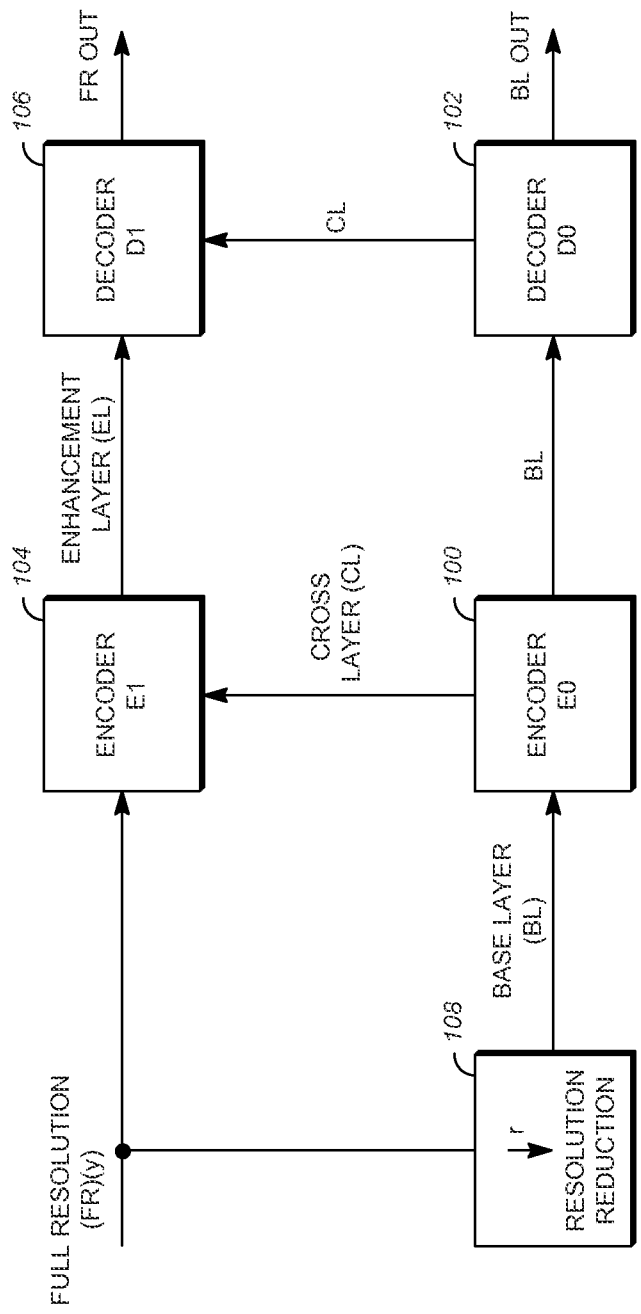
FIG. 1 is a block diagram of components in a scalable video coding system with two layers.

An example of a scalable video coding system using two layers is shown in FIG. 1. In the system of FIG. 1, one of the two layers is the Base Layer (BL) where a BL video is encoded in an Encoder E0, labeled 100, and decoded in a decoder D0, labeled 102, to produce a base layer video output BL out. The BL video is typically at a lower quality than the remaining layers, such as the Full Resolution (FR) layer that receives an input FR (y). The FR layer includes an encoder E1, labeled 104, and a decoder D1, labeled 106. In encoding in encoder E1 104 of the full resolution video, cross-layer (CL) information from the BL encoder 100 is used to produce enhancement layer (EL) information. The corresponding EL bitstream of the full resolution layer is then decoded in decoder D1 106 using the CL information from decoder D0 102 of the BL to output full resolution video, FR out. By using CL information in a scalable video coding system, the encoded information can be transmitted more efficiently in the EL than if the FR was encoded independently without the CL information. An example of coding that can use two layers shown in FIG. 1 includes video coding using AVC and the Scalable Video Coding (SVC) extension of AVC, respectively. Another example that can use two layer coding is HEVC.

FIG. 1 further shows block 108 with a down-arrow r illustrating a resolution reduction from the FR to the BL to illustrate that the BL can be created by a downsampling of the FR layer data. Although a downsampling is shown by the arrow r of block 108 FIG. 1, the BL can be independently created without the downsampling process. Overall, the down arrow of block 108 illustrates that in spatial scalability, the base layer BL is typically at a lower spatial resolution than the full resolution FR layer. For example, when r=2 and the FR resolution is 3840×2160, the corresponding BL resolution is 1920×1080.

The cross-layer CL information provided from the BL to the FR layer shown in FIG. 1 illustrates that the CL information can be used in the coding of the FR video in the EL. In one example, the CL information includes pixel information derived from the encoding and decoding process of the BL. Examples of BL encoding and decoding are AVC and HEVC. Because the BL pictures are at a different spatial resolution than the FR pictures, a BL picture needs to be upsampled (or re-sampled) back to the FR picture resolution in order to generate a suitable prediction for the FR picture.

Figure 2:
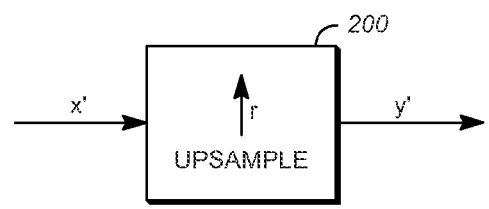
FIG. 2 illustrates an upsampling process that can be used to convert the base layer data to the full resolution layer data for FIG. 1.

FIG. 2 illustrates an upsampling process in block 200 of data from the BL layer to the EL. The components of the upsampling block 200 can be included in either or both of the encoder E1 104 and the decoder D1 106 of the EL of the video coding system of FIG. 1. The BL data at resolution x that is input into upsampling block 200 in FIG. 2 is derived from one or more of the encoding and decoding processes of the BL. A BL picture is upsampled using the up-arrow r process of block 200 to generate the EL resolution output y' that can be used as a basis for prediction of the original FR input y.

The upsampling block 200 works by interpolating from the BL data to recreate what is modified from the FR data. For instance, if every other pixel is dropped from the FR in block 108 to create the lower resolution BL data, the dropped pixels can be recreated using the upsampling block 200 by interpolation or other techniques to generate the EL resolution output y' from upsampling block 200. The data y' is then used to make encoding and decoding of the EL data more efficient.

Overview of Upsampling Circuitry

Figure 3:
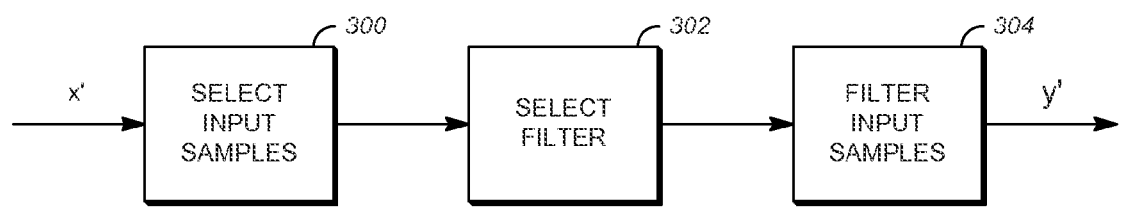
FIG. 3 shows a block diagram of components for implementing the upsampling process of FIG. 2.

FIG. 3 shows a general block diagram for implementing an upsampling process of FIG. 2 for embodiments of the present invention. The upsampling or re-sampling process can be determined to minimize an error E (e.g. mean-squared error) between the upsampled data y' and the full resolution data y. The system of FIG. 3 includes a select input samples module 300 that samples an input video signal. The system further includes a select filter module 302 to select a filter from the subsequent filter input samples module 304 to upsample the selected input samples from module 300.

In module 300, a set of input samples in a video signal x is first selected. In general, the samples can be a two-dimensional subset of samples in x, and a two-dimensional filter can be applied to the samples. The module 302 receives the data samples in x from module 300 and identifies the position of each sample from the data it receives, enabling module 302 to select an appropriate filter to direct the samples toward a subsequent filter module 304. The filter in module 304 is selected to filter the input samples, where the selected filter is chosen or configured to have a phase corresponding to the particular output sample location desired.

The filter input samples module 304 can include separate row and column filters. The selection of filters is represented herein as filters h[n; p], where the filters can be separable along each row or column, and p denotes a phase index selection for the filter. The output of the filtering process using the selected filter h[n;p] on the selected input samples produces output value y'.

Figure 4:
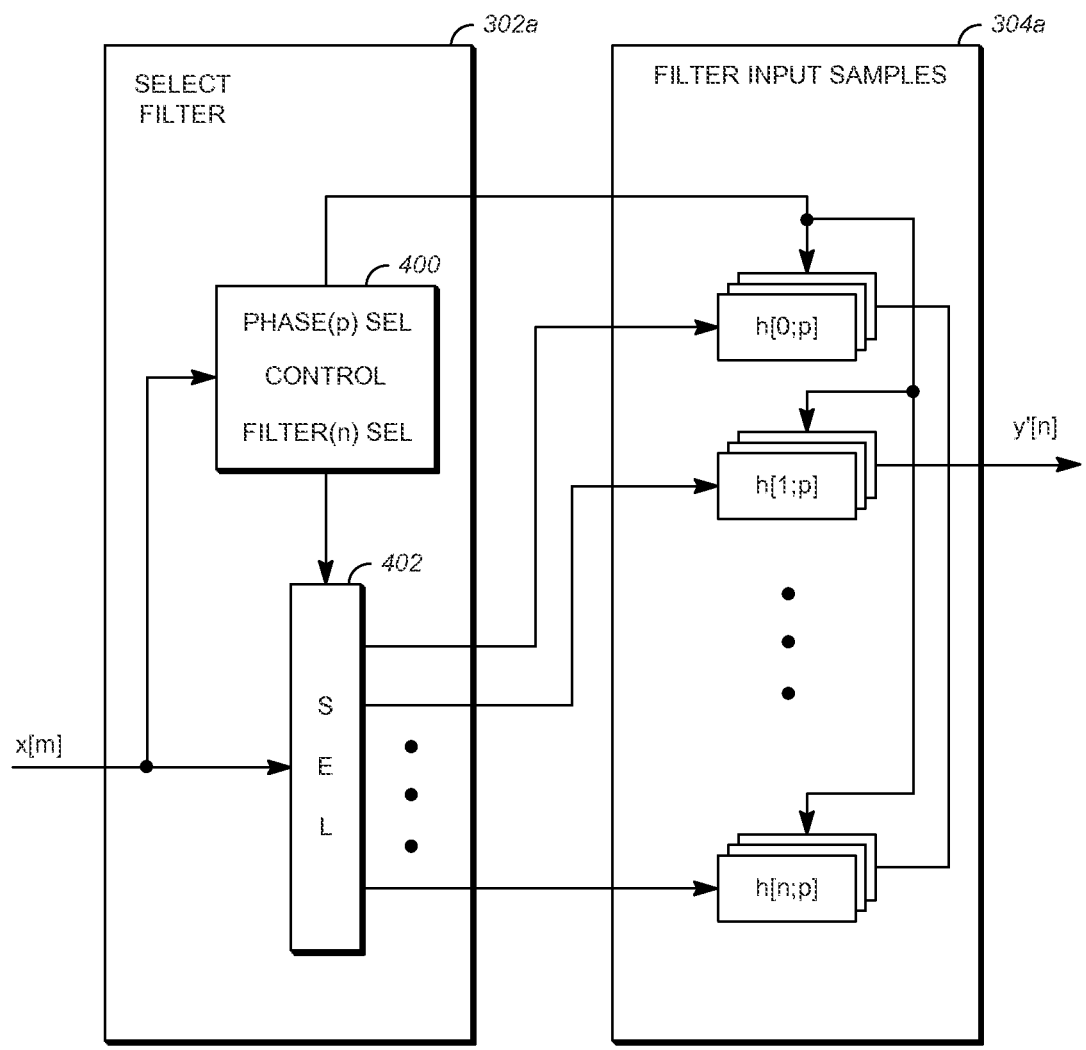
FIG. 4 shows components of the select filter module and the filters, where the filters are selected from fixed or adaptive filters to apply a desired phase shift.

FIG. 4 shows details of components for the select sample module 302 of FIG. 3 (labeled 302a in FIG. 4) and the filters module 304 of FIG. 3 (labeled 304a in FIG. 4) for a system with fixed filters. For separable filtering the input samples can be along a row or column of data. To supply a set of input samples from select input samples module 300, the select filter module 302a includes a select control 400 that identifies the input samples x[m] and provides a signal to a selector 402 that directs them through the selector 402 to a desired filter. The filter module 304a then includes the different filters h[n;p] that can be applied to the input samples, where the filter phase can be chosen among P phases from each row or column element depending on the output sample m desired. As shown, the selector 402 of module 302a directs the input samples to a desired column or row filter in 304a based on the "Filter (n) SEL" signal from select control 400. A separate select control 400 signal "Phase (p) SEL" selects the appropriate filter phase p for each of the row or column elements. The filter module 304a output produces the output y'[n].

In FIG. 4, the outputs from individual filter components h[n;p] are shown added "+" to produce the output y'[n]. This illustrates that each box, e.g. h[0;p], represents one coefficient or number in a filter with phase p. Therefore, the filter with phase p is represented by all n+1 numbers in h[0,p], . . . , h[n;p]. This is the filter that is applied to the selected input samples to produce an output value y'[n], for example, y'[0]=h[0,p]*x[0]+h[1,p]*x[1]+ . . . +h[n,p]*x[n], requiring the addition function "+" as illustrated. As an alternative to adding in FIG. 4, the "+" could be replaced with a solid connection and the output y'[n] would be selected from one output of a bank of P filters representing the p phases, with the boxes h[n:p] in module 304a relabeled, for example, as h[n;0], h[n,1], . . . , h[n,p−1] and now each box would have all the filter coefficients needed to form y'[n] without the addition element required.

Previously Proposed Reference Layer and Scaled Reference Layer Offsets

In order to accommodate for offset and phase shift differences between the BL and EL samples, phase offset adjustment parameters can be signaled. Let a sample location relative to the top-left sample in the current EL picture be (xP, yP), and a sample location in the BL reference layer in units of 1/16-th sample relative to the top-left sample of the BL be (xRef16, yRef16). In J. Chen, J. Boyce, Y. Ye, M. Hannuksela, G. Sullivan, Y. Wang, "High efficiency video coding (HEVC) scalable extension Draft 5," JCTVC-P1008_v4, January 2014, the relationship between (xRef16, yRef16) and (xP, yP) is given as follows:

$$xRef16=(((xP-\text{offsetX})*\text{ScaleFactorX}+\text{addX}+(1<<11))>>12)-(\text{phaseX}<<2)$$

$$yRef16=(((yP-\text{offsetY})*\text{ScaleFactorY}+\text{addY}+(1<<11))>>12)-(\text{phaseY}<<2)$$

The sample position (xRef16, yRef16) is used to select the input samples and the filters used in computing the output sample values as specified in J. Chen, J. Boyce, Y. Ye, M. Hannuksela, G. Sullivan, Y. Wang, "High efficiency video coding (HEVC) scalable extension Draft 5," JCTVC-P1008_v4, January 2014.

The variables offsetX, addX, offsetY, and addY specify scaled reference layer offset and phase parameters in the horizontal and vertical directions, variables phaseX and phaseY specify reference layer phase offset parameters in the horizontal and vertical directions, and variables ScaleFactorX and ScaleFactorY are computed based on the ratio of the reference layer to the scaled reference layer width and height. These variables are computed based upon phase offset parameters specified in J. Chen, J. Boyce, Y. Ye, M. Hannuksela, G. Sullivan, Y. Wang, "High efficiency video coding (HEVC) scalable extension Draft 5," JCTVC-P1008_v4, January 2014.

In order to accommodate other applications such as interlace/progressive scalability and to increase the resolution for BL and EL alignment, it was previously described in U.S. patent application Ser. No. 14/661,867 filed on Mar. 18, 2015 and incorporated by reference in its entirety, that the phase offset adjustment parameters in Tables 1 and 2 be signaled.

In a previously-proposed method, the scaled reference layer offset parameters are signaled at the PPS level. In Table 1, the pps_multilayer_extension syntax is parsed if a pps_extension_type_flag[1] (e.g. pps_multilayer_extension_ flag) is set. Table 2 shows the scaled_ref_layer_id, scaled_ref_layer_left_offset, scaled_ref_layer_top_offset, scaled_ref_layer_right_offset and scaled_ref_layer_bottom_offset syntax elements signaled in the pps_multilayer_ extension.

The resolution of the scaled reference layer offset can be increased from 2-integer pel. The original coarser resolution allows for selection of a region in the scaled reference layer, while the additional proposed finer resolution allows for finer local phase offset adjustment between layers. Table 2 shows an example of the signaling of the previously-proposed additional phase offset parameters:

scaled_ref_layer_left_phase[scaled_ref_layer_id[i]] specifies the horizontal luma offset between nuh_layer_id_e qual to scaled_ref_layer_id[i] and the current picture in units of ½ luma samples. This is a signed value between −2 to +2. When not present, the value of scaled_ref_layer_left_phase [scaled_ref_layer_id[i]] is inferred to be equal to 0.

scaled_ref_layer_top_phase[scaled_ref_layer_id[i]] specifies the vertical luma offset between nuh_layer_id_ equal to scaled_ref_layer_id[i] and the current picture in units of ½ luma samples. This is a signed value between −2 to +2. When not present, the value of scaled_ref_layer_top_ phase[scaled_ref_layer_id[i]] is inferred to be equal to 0.

ref_layer_horizontal_delta[scaled_ref_layer_id[i]] specifies the horizontal luma offset between nuh_layer_id_equal to scaled_ref_layer_id[i] and the current picture in units of ⅛ luma samples. This is a signed value between −8 to 8. When not present, the value of ref_layer_horizontal_delta [scaled_ref_layer_id[i]] is inferred to be equal to 0.

ref_layer_vertical_delta[scaled_ref_layer_id[i]] specifies the vertical luma offset between nuh_layer_id_equal to scaled_ref_layer_id[i] and the current picture in units of ⅛ luma samples. This is a signed value between −8 to +8. When not present, the value of ref_layer_vertical_delta [scaled_ref_layer_id[i]] is inferred to be equal to 0.

ref_layer_horizontal_delta_chroma[scaled_ref_layer_id [i]] specifies the horizontal offset between the chroma samples and luma samples in nuh_layer_id_equal to scaled_ref_layer_id[i] in units of ¼ luma samples. This is an unsigned value between 0 to 4. When not present, the value of ref_layer_horizontal_delta_chroma[scaled_ref_layer_id [i]] is inferred to be equal to 2.

ref_layer_vertical_delta_chroma[scaled_ref_layer_id[i]] specifies the vertical offset between the chroma samples and luma samples in nuh_layer_id_equal to scaled_ref_layer_id [i] in units of ¼ luma samples. This is an unsigned value between 0 to 4. When not present, the value of ref_layer_vertical_delta_chroma [scaled_ref_layer_id[i]] is inferred to be equal to 2.

scaled_ref_layer_left_phase_chroma specifies the horizontal chroma offset relative to luma in units of ¼ luma samples. This is an unsigned value between 0 to 4. When not present, the value of scaled_ref_layer_left_phase_chroma is inferred to be equal to 2.

scaled_ref_layer_top_phase_chroma specifies the vertical chroma offset relative to luma in units of ¼ luma samples. This is an unsigned value between 0 to 4. When not present, the value of scaled_ref_layer_top_phase_chroma is inferred to be equal to 2.

The additional syntax elements are used to provide finer alignment between the layers. One example of the use of the syntax is as follows:

ScaledRefLayerLeftPhase=scaled_ref_layer_left_phase[rLId]

ScaledRefLayerTopPhase=scaled_ref_layer_top_phase[rLId]

RefLayerHorizontalDelta=ref_layer_horizontal_delta [rLId]

RefLayerVerticalDelta=ref_layer_vertical_delta[rLId]

RefLayerHorizontalDeltaChroma=ref_layer_horizontal_ delta_chroma[rLId]

RefLayerVerticalDeltaChroma=ref_layer_vertical_ delta_chroma[rLId]

phaseX=(cIdx==0)?(ScaledRefLayerLeftPhase<<2): (ScaledRefLayerLeftPhase<<1+scaled_ref_layer_left_phase_chroma)

phaseY=(cIdx==0)?(ScaledRefLayerTopPhase<<2): (ScaledRefLayerTopPhase<<1+scaled_ref_layer_top_phase_chroma)

deltaX=(cIdx==0)?(RefLayerHorizontalDelta<<1): (RefLayerHorizontalDelta+RefLayerHorizontalDeltaChroma<<1)

deltaY=(cIdx==0)?(RefLayerVerticalDelta<<1):(RefLayerVerticalDelta+RefLayerVerticalDeltaChroma<<1)

$$addX=(ScaleFactorX*phaseX+4)>>3 \qquad (1)$$

$$addY=(ScaleFactorY*phaseY+4)>>3 \qquad (2)$$

$$xRef16=(((xP-\text{offset}X)*ScaleFactorX+addX+ (1<<11))>>12)-deltaX \qquad (3)$$

$$yRef16=(((yP-\text{offset}Y)*ScaleFactorY+addY+ (1<<11))>>12)-deltaY \qquad (4)$$

The scaled reference layer phase offset parameters scaled_ref_layer_left_phase, scaled_ref_layer_left_ phase_chroma, scaled_ref_layer_top_phase, and scaled_ref_layer_top_phase_chroma provide additional independent finer level or resolution over the previous scaled reference layer phase offset parameters scaled_ref_layer_ left_offset, scaled_ref_layer_top_offset, scaled_ref_layer_ right_offset and scaled_ref_layer_bottom_offset. In addition, the reference layer phase offset parameters ref_layer_ horizontal_delta, ref_layer_vertical_delta, ref_layer_horizontal_delta_chroma and ref_layer_vertical_delta_chroma provide finer reference layer phase offset resolution.

TABLE 1

Previously proposed syntax for activating PPS multilayer extension.

| | Descriptor |
|---|---|
| pic_parameter_set_rbsp( ) { | |
|   pps_pic_parameter_set_id | ue(v) |
|   pps_seq_parameter_set_id | ue(v) |
|   ... | |
|   pps_extension_flag | u(1) |
|   if( pps_extension_flag ) { | |
|     for ( i = 0; i < 8; i++ ) | |
|       pps_extension_type_flag[ i ] | u(1) |
|     if( pps_extension_type_flag[ 0 ] ) | |
|       poc_reset_info_present_flag | u(1) |
|     if( pps_extension_type_flag[ 1 ] ) | |
|       pps_multilayer_extension( ) | |
|     if( pps_extension_type_flag[ 7 ] ) | |
|       while( more_rbsp_data( ) ) | |
|         pps_extension_data_flag | u(1) |
|   } | |
|   rbsp_trailing_bits( ) | |
| } | |

TABLE 2

Previously proposed syntax for signaling offsets at PPS multilayer extension.

|  | Descriptor |
|---|---|
| pps_multilayer_extension( ) { |  |
|   num_scaled_ref_layer_offsets | ue(v) |
|   for( i = 0; i < num_scaled_ref_layer_offsets; i++) { |  |
|     scaled_ref_layer_id[ i ] | u(6) |
|     scaled_ref_layer_left_offset[ scaled_ref_layer_id[ i ] ] | se(v) |
|     scaled_ref_layer_top_offset[ scaled_ref_layer_id[ i ] ] | se(v) |
|     scaled_ref_layer_right_offset[ scaled_ref_layer_id[ i ] ] | se(v) |
|     scaled_ref_layer_bottom_offset[ scaled_ref_layer_id[ i ] ] | se(v) |
|     scaled_ref_layer_left_phase[ scaled_ref_layer_id[ i ] ] | se(v) |
|     scaled_ref_layer_top_phase[ scaled_ref_layer_id[ i ] ] | se(v) |
|     ref_layer_horizontal_delta[ scaled_ref_layer_id[ i ] ] | se(v) |
|     ref_layer_vertical_delta[ scaled_ref_layer_id[ i ] ] | se(v) |
|     ref_layer_horizontal_delta_chroma [ scaled_ref_layer_id[ i ] ] | ue(v) |
|     ref_layer_vertical_delta_chroma [ scaled_ref_layer_id[ i ] ] | ue(v) |
|   } |  |
|   scaled_ref_layer_left_phase_chroma | ue(v) |
|   scaled_ref_layer_top_phase_chroma | ue(v) |
| } |  |

A previously-proposed syntax allows for interlace to progressive scalability and finer alignment between layers. Example syntax was given to illustrate how additional phase offset parameters in both scaled reference layer and the reference layer can be used for alignment between layers.

Proposed Approaches to Handle Enhanced Layer (EL) and Base Layer (BL) Offsets

Figure 5:
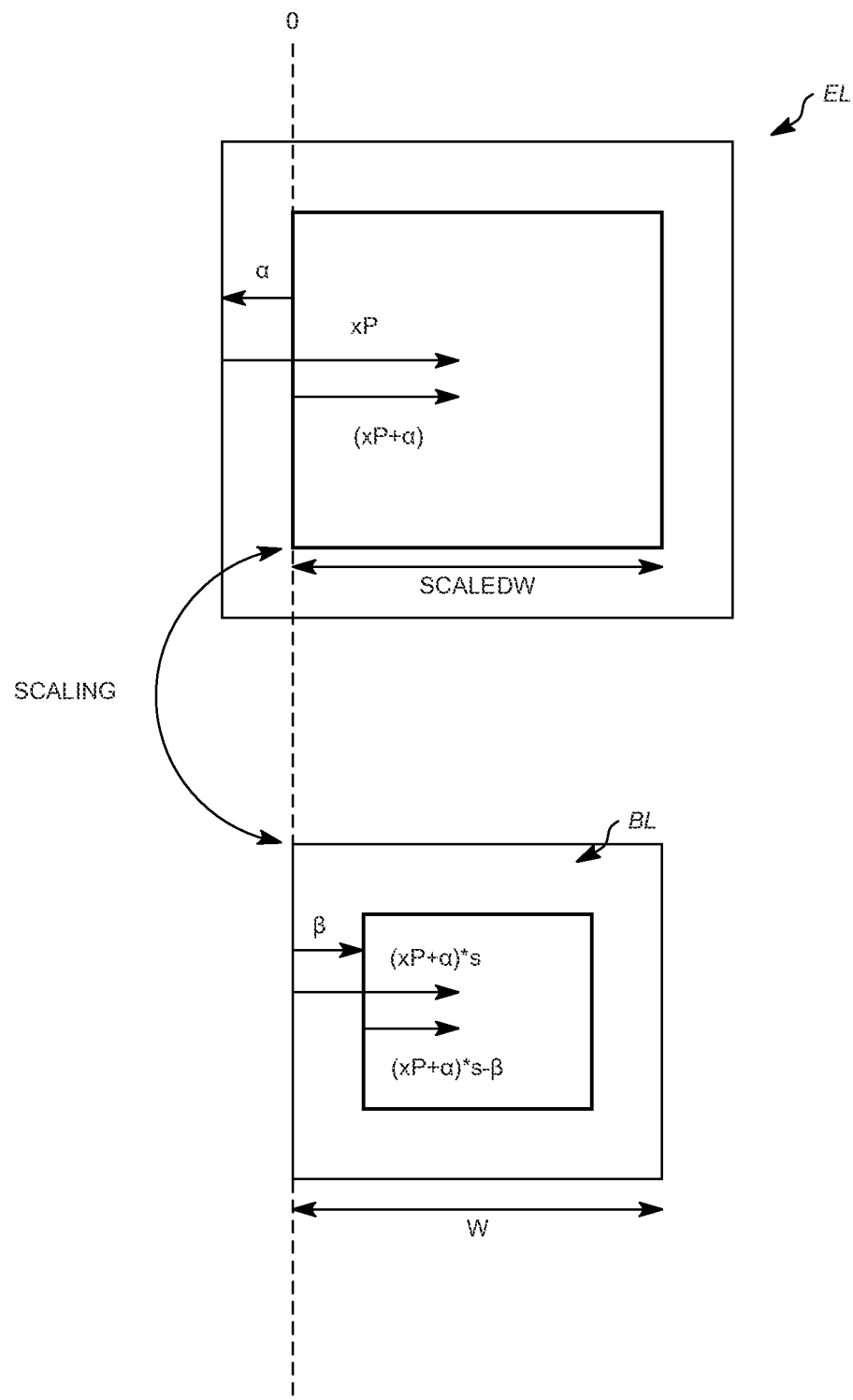
FIG. 5 shows example offsets and windows in the EL and BL.

A general formulation of the mapping between EL and BL can by illustrated as in FIG. 5. For purposes of illustration, FIG. 5 shows an example of mapping in one dimension (e.g. horizontal or row) and for one color component (e.g. luma). It is straightforward to extend the concepts to other dimensions (e.g. vertical or column) and color components (e.g. chroma). In addition, it is possible to express chroma component offsets relative to luma offsets.

In FIG. 5, in one example, a window is defined relative to the EL using an offset $\alpha$. This window has a width of ScaledW. A sample position xP in the EL is (xP+$\alpha$) relative to the window. The scaled window of width ScaledW corresponds to a scaled down window of width W. If the scaling factor is s, then the position (xP+$\alpha$) in the scaled window EL corresponds to a position (xP+$\alpha$)*s in the scaled down window, where s=W/ScaledW. If a new BL window is defined relative to the scaled down window using an offset $\beta$, then the sample position in the BL is $$x\text{Ref}=(xP+\alpha)^*s-\beta. \quad (5)$$

In one example, if $\alpha$ has a resolution of ½ pixel, $\beta$ has a resolution of ¼ pixel, and the scale factor s has a 16-bit resolution, then this equation can be written as $$x\text{Ref}=((xP+\alpha>>1)^*s+(1<<15))>>16-(\beta>>2).$$

For 1/16 pixel resolution, this becomes $$x\text{Ref}16=((xP+\alpha>>1)^*s+(1<<11))>>12-(\beta-2). \quad (6)$$

This equation is similar to Equation (3) except that the offset and phase values (e.g. offsetX and phaseX) are effectively combined into $\alpha$. The scaled reference layer offset and phase values in Equation (3) may represent a coarser and finer offset precision, respectively, while Equation (6) combines these values into a single parameter $\alpha$. Alternatively, a single scaled reference layer parameter $\alpha$ can be decomposed into a coarser offset and finer phase components. This also illustrates that different values for the scaled reference layer offset and phase values in Equation (3) and (1) can achieve the same effective offset as far as the computation of xRef16 is concerned. For arbitrary pixel resolution, and using Equation (1), Equation (3) can be expressed as $$x\text{Ref}=((xP-\text{offset}X+\text{phase}X)^*\text{ScaleFactor}X)-\text{delta}X \quad (7)$$

Comparing Equation (7) with Equation (5) yields $$\alpha=-\text{offset}X+\text{phase}X$$

$$\beta=\text{delta}X$$

This illustrates that the scaled reference offset (e.g. $\alpha$) can consist of components from coarse (e.g. integer for offset X) and fine (e.g. subpixel for phase X) resolutions.

It is important to note that both $\alpha$ and $\beta$ are in general necessary to maintain sample position accuracy, as their precision together with the scale factor value s determines the BL sample position accuracy. These offset values can be signaled to the decoder, for example, per dimension and per color component, and they can be signaled at the PPS level (or its extensions), SPS, VPS, slice level, etc.

If it is desired to only signal one offset parameter, then the following can be considered $$x\text{Ref}=xP^*s+(\alpha^*s-\beta),$$

where an offset parameter in the BL domain can be signaled to represent ($\alpha^*s-\beta$). However, for a given resolution in the offset parameter, it may not be possible to accurately signal ($\alpha^*s-\beta$), depending on the resolution of $\alpha$, $\beta$, and the scale factor s. If it is desired to signal one offset parameter in the EL domain, then in $$x\text{Ref}=(xP+(\alpha-\beta/s))^*s,$$

it may not be possible to accurately signal ($\alpha-\beta/s$), depending on the resolution of $\alpha$, $\beta$, and the scale factor s along with the division operation. Also note that this offset is also further scaled by s.

In an alternative formulation, the BL reference sample position can be written as $$x\text{Ref}=(xP^*s)+(\gamma/\text{Scaled}W)$$

$$\gamma=(\alpha^*W-\beta^*\text{Scaled}W).$$

If s' is defined, for example, such that $$s'=(1<<16+\text{Scaled}W>>1)/\text{Scaled}W$$

then $$x\text{Ref}=(xP^*s+(\gamma>>2)^*s'+(1<<15))>>16$$

$$x\text{Ref}16=(xP^*s+(\gamma>>2)^*s'+(1<<11))>>12.$$

In this formulation, two parameters (W, γ) are required for accurate sample position calculation, similar to the case where two parameters (α,β) were required for accurate sample position calculation in the original formulation. Note in this case that it is possible to define ScaledW=Width+α−ScaledRefRightOffset, W=RefWidth+β−RefRightOffset.

Also, for transmission of s=W/ScaledW, it is possible to transmit integers N and D, where s=W/ScaledW=N/D.

Figure 6A:
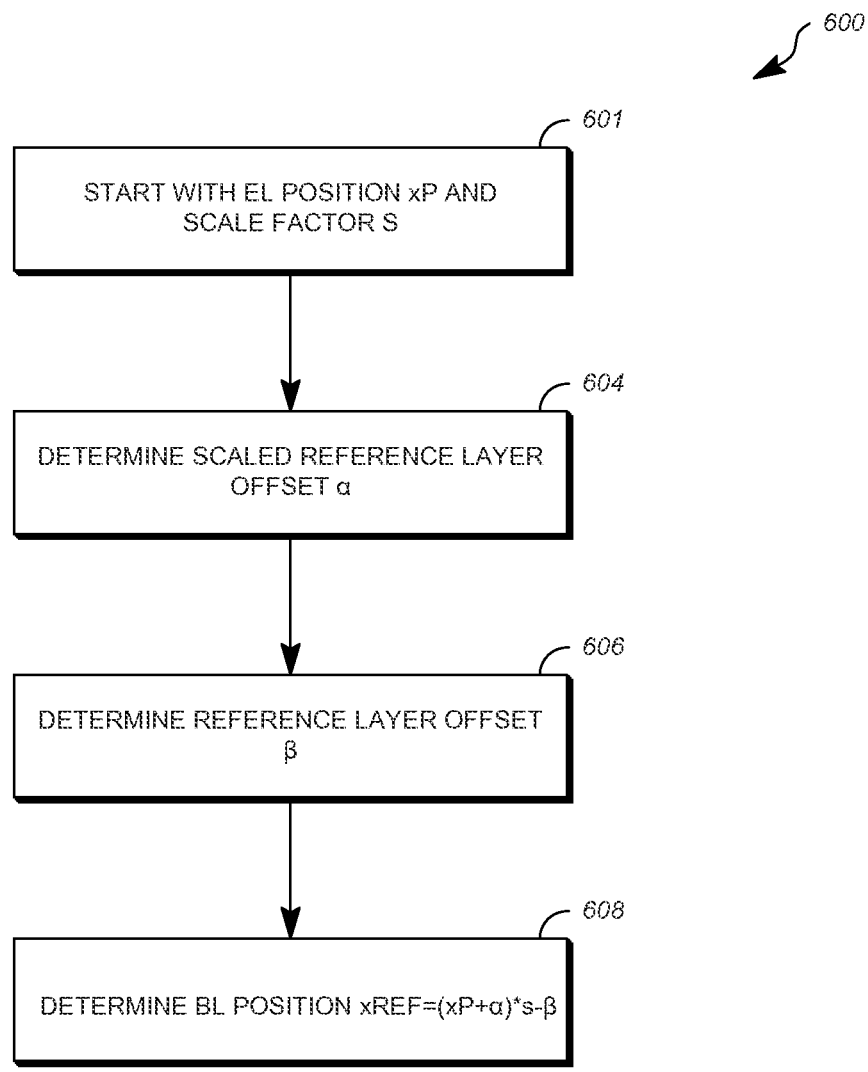
FIGS. 6a, 6b, and 6c are examples of simplified flow charts showing the process for determining the reference layer location based upon offsets in a method for coding scalable video.

FIG. 6a is one example computation of reference layer position using two offset parameters in a horizontal direction. At block 601, start with EL position xP, and scale factor s. At block 604, determine the scaled reference layer offset α. Then, determine reference layer offset β at block 606. Finally at block 608, determine BL position xRef=(xP+α)*s−β.

Figure 6B:
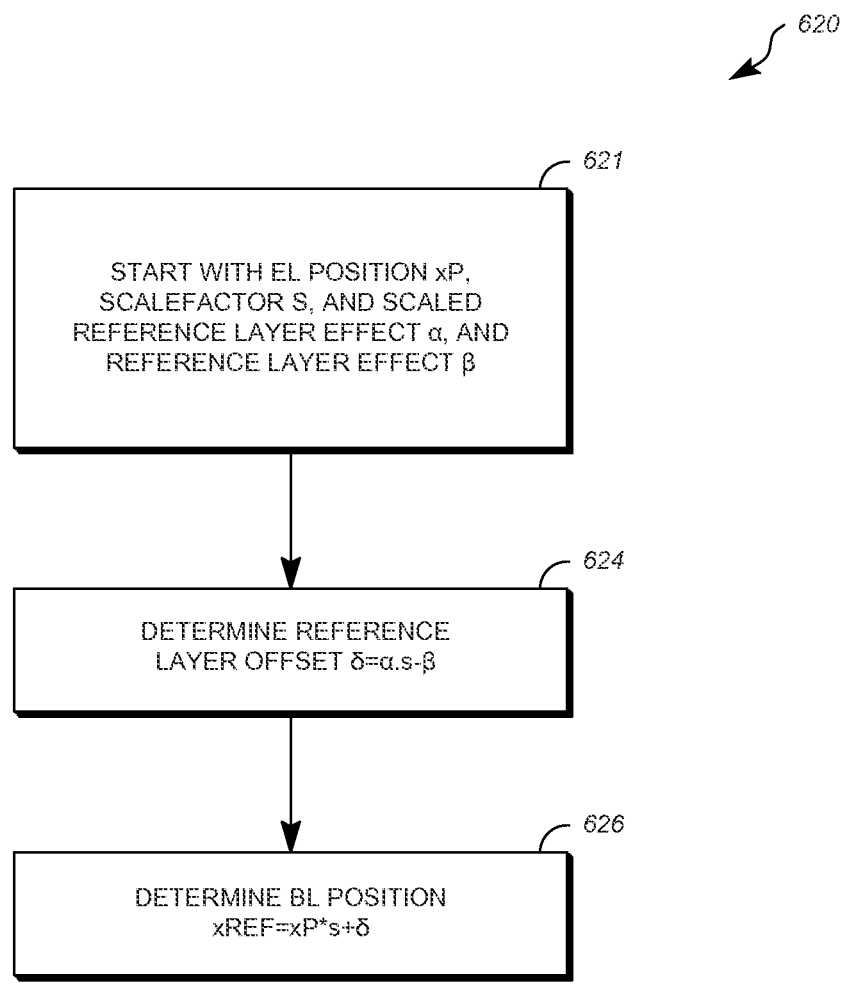

FIG. 6b is an example computation of reference layer position using a single reference layer offset (also in a horizontal direction) from α, β.

Beginning at block 620, start with EL position xP, scale factor s, and scaled reference layer offset α and reference layer offset β.

At block 622, determine the reference layer offset δ=α*s−β.

Finally at block 624, determine BL position xRef=xP*s+δ.

Figure 6C:
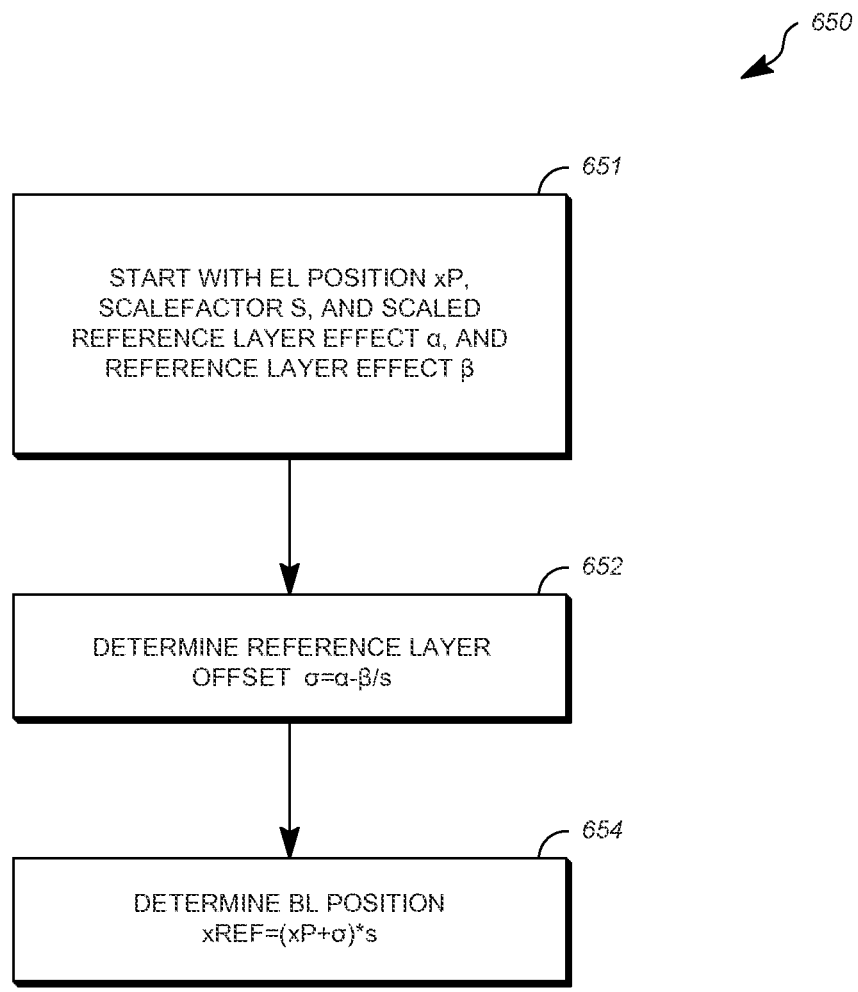

FIG. 6c is one example of computation of reference layer position using a single scaled reference layer offset (in horizontal direction) from α, β.

At block 650, start with EL position xP, scale factor s, and scaled reference layer offset α and reference layer offset β. At block 652, determine scaled reference layer offset σ−α−β/s.

Finally, at block 654, determine BL position xRef=(xP+σ)*s.

Illustrative Operating Environment

Figure 7:
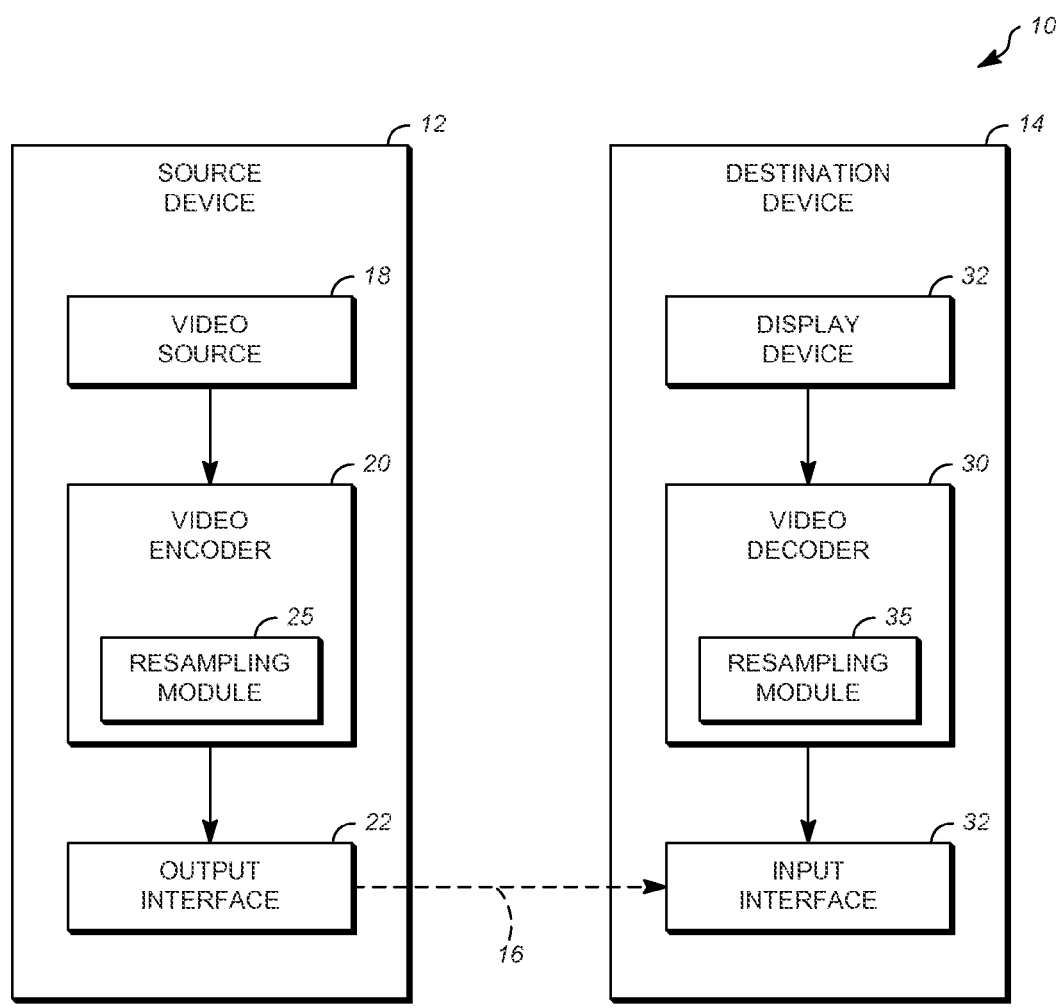
FIG. 7 is a simplified block diagram that illustrates an example video coding system.

FIG. 7 is a simplified block diagram that illustrates an example video coding system 10 that may utilize the techniques of this disclosure. As used described herein, the term "video coder" can refer to either or both video encoders and video decoders. In this disclosure, the terms "video coding" or "coding" may refer to video encoding and video decoding.

As shown in FIG. 7, video coding system 10 includes a source device 12 and a destination device 14. Source device 12 generates encoded video data. Accordingly, source device 12 may be referred to as a video encoding device. Destination device 14 may decode the encoded video data generated by source device 12. Accordingly, destination device 14 may be referred to as a video decoding device. Source device 12 and destination device 14 may be examples of video coding devices.

Destination device 14 may receive encoded video data from source device 12 via a channel 16. Channel 16 may comprise a type of medium or device capable of moving the encoded video data from source device 12 to destination device 14. In one example, channel 16 may comprise a communication medium that enables source device 12 to transmit encoded video data directly to destination device 14 in real-time.

In this example, source device 12 may modulate the encoded video data according to a communication standard, such as a wireless communication protocol, and may transmit the modulated video data to destination device 14. The communication medium may comprise a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or other equipment that facilitates communication from source device 12 to destination device 14. In another example, channel 16 may correspond to a storage medium that stores the encoded video data generated by source device 12.

In the example of FIG. 7, source device 12 includes a video source 18, video encoder 20, and an output interface 22. In some cases, output interface 22 may include a modulator/demodulator (modem) and/or a transmitter. In source device 12, video source 18 may include a source such as a video capture device, e.g., a video camera, a video archive containing previously captured video data, a video feed interface to receive video data from a video content provider, and/or a computer graphics system for generating video data, or a combination of such sources.

Video encoder 20 may encode the captured, pre-captured, or computer-generated video data. The encoded video data may be transmitted directly to destination device 14 via output interface 22 of source device 12. The encoded video data may also be stored onto a storage medium or a file server for later access by destination device 14 for decoding and/or playback.

In the example of FIG. 7, destination device 14 includes an input interface 28, a video decoder 30, and a display device 32. In some cases, input interface 28 may include a receiver and/or a modem. Input interface 28 of destination device 14 receives encoded video data over channel 16. The encoded video data may include a variety of syntax elements generated by video encoder 20 that represent the video data. Such syntax elements may be included with the encoded video data transmitted on a communication medium, stored on a storage medium, or stored a file server.

Display device 32 may be integrated with or may be external to destination device 14. In some examples, destination device 14 may include an integrated display device and may also be configured to interface with an external display device. In other examples, destination device 14 may be a display device. In general, display device 32 displays the decoded video data to a user.

Video encoder 20 includes a resampling module 25 which may be configured to code (e.g., encode) video data in a scalable video coding scheme that defines at least one base layer and at least one enhancement layer. Resampling module 25 may resample at least some video data as part of an encoding process, wherein resampling may be performed in an adaptive manner using resampling filters. Likewise, video decoder 30 may also include a resampling module 35 similar to the resampling module 25 employed in the video encoder 20.

Video encoder 20 and video decoder 30 may operate according to a video compression standard, such as the High Efficiency Video Coding (HEVC) standard. The HEVC standard is being developed by the Joint Collaborative Team on Video Coding (JCT-VC) of ITU-T Video Coding Experts Group (VCEG) and ISO/IEC Motion Picture Experts Group (MPEG). A recent draft of the HEVC standard is described in the Recommendation ITU-T H.265|International Standard ISO/IEC 23008-2, High efficiency video coding, version 2, October 2014.

Additionally or alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard or technique. Other examples of video compression standards and techniques include MPEG-2, ITU-T H.263 and proprietary or open source compression formats and related formats.

Video encoder 20 and video decoder 30 may be implemented in hardware, software, firmware or any combination thereof. For example, the video encoder 20 and decoder 30 may employ one or more processors, digital signal processors (DSPs), application specific integrated circuits (ASICs), field programmable gate arrays (FPGAs), discrete logic, or any combinations thereof. When the video encoder 20 and decoder 30 are implemented partially in software, a device may store instructions for the software in a suitable, non-transitory computer-readable storage medium and may execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Also, it is noted that some embodiments have been described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

Although the subject matter has been described in language specific to structural features and/or methodological acts, it is to be understood that the subject matter defined in the appended claims is not necessarily limited to the specific features or acts described above.

What is claimed:

1. A system for scalable video coding, comprising:
a first coding layer comprising a video encoder and/or a video decoder for coding video with a base resolution;
a second coding layer comprising a video encoder and/or a video decoder for coding video with an enhanced resolution having a higher resolution than a base resolution;
wherein pixel values in the second coding layer are predicted based on pixel values in the first coding layer;
wherein the prediction of a value at a pixel location in the second coding layer is based on a corresponding value at a pixel location in the first coding layer;
wherein the corresponding pixel location in the first coding layer is computed based on the pixel location in the second coding layer;
wherein the computation uses a scaled reference layer offset parameter $\alpha$ that specifies an offset between the sample in the second layer that is collocated with the top-left sample of the first layer and the top-left sample of the second layer;
wherein scaled reference layer offset parameter $\alpha$ is derived from a coarse offset component and a fine offset component.

2. The system of claim 1, wherein the scaled reference layer offset parameter specifies the horizontal component of the offset.

3. The system of claim 1, wherein the scaled reference layer offset parameter specifies the vertical component of the offset.

4. A system for scalable video coding, comprising:
a first coding layer comprising a video encoder and/or a video decoder for coding video with a base resolution;
a second coding layer comprising a video encoder and/or a video decoder for coding video with an enhanced resolution having a higher resolution than a base resolution;
wherein pixel values in the second coding layer are predicted based on pixel values in the first coding layer;
wherein the prediction of a value at a pixel location in the second coding layer is based on a corresponding value at a pixel location in the first coding layer;
wherein the corresponding pixel location in the first coding layer is computed based on the pixel location in the second coding layer;
wherein the computation of the scaled reference layer offset uses a combination of two scaled reference layer offset parameters that specify an offset between the sample in the second layer that is collocated with the top-left sample of the first layer and the top-left sample of the second layer; and
wherein one of the scaled reference layer offset parameters is a coarse offset component and the other scaled reference layer offset parameter is a fine offset component.

5. A system for scalable video coding, comprising:
a first coding layer comprising a video encoder and/or a video decoder for coding video with a base resolution;
a second coding layer comprising a video encoder and/or a video decoder for coding video with an enhanced resolution having a higher resolution than a base resolution;
wherein pixel values in the second coding layer are predicted based on pixel values in the first coding layer;
wherein the prediction of a value at a pixel location in the second coding layer is based on a corresponding value at a pixel location in the first coding layer;
wherein the corresponding pixel location in the first coding layer is computed based on the pixel location in the second coding layer; and
wherein the computation uses a single reference layer offset parameter $\delta$ that is derived from a scaled reference layer offset $\alpha$ and a reference layer offset $\beta$.

6. The system of claim 5, wherein the single reference layer offset parameter specifies the horizontal component of the offset.

7. The system of claim 5, wherein the single reference layer offset parameter specifies the vertical component of the offset.

8. The system of claim 5, comprising:
a scaled reference layer offset parameter $\alpha$ that specifies an offset between the sample in the second layer that is collocated with the top-left sample of the first layer and the top-left sample of the second layer;
a reference layer offset parameter $\beta$ that specifies an offset between the sample in the second layer and the top-left sample of the second layer; and
a scale factor s that represents the ratio of the first layer width to the second layer width,
wherein the computation uses a single reference layer offset parameter $\delta$ that is computed as $\alpha*s-\beta$.

9. A system for scalable video coding, comprising:
a first coding layer comprising a video encoder and/or a video decoder for coding video with a base resolution;
a second coding layer comprising a video encoder and/or a video decoder for coding video with an enhanced resolution having a higher resolution than a base resolution;
wherein pixel values in the second coding layer are predicted based on pixel values in the first coding layer;
wherein the prediction of a value at a pixel location in the second coding layer is based on a corresponding value at a pixel location in the first coding layer;
wherein the corresponding pixel location in the first coding layer is computed based on the pixel location in the second coding layer; and
wherein the computation uses a single scaled reference layer offset parameter $\sigma$ that is derived from a scaled reference layer offset $\alpha$ and a reference layer offset $\beta$.

10. The system of claim 9, wherein the single scaled reference layer offset parameter specifies the horizontal component of the offset.

11. The system of claim 9, wherein the single scaled reference layer offset parameter specifies the vertical component of the offset.

12. The system of claim 9, comprising:
a scaled reference layer offset parameter $\alpha$ that specifies an offset between the sample in the second layer that is collocated with the top-left sample of the first layer and the top-left sample of the second layer;
a reference layer offset parameter $\beta$ that specifies an offset between the sample in the second layer and the top-left sample of the second layer;
a scale factor s that represents the ratio of the first layer width to the second layer width;
wherein the computation uses a single reference layer offset parameter $\sigma$ that is computed as $\alpha-(\beta/s)$.

* * * * *